(12) United States Patent
Ratnaparkhi

(10) Patent No.: US 9,990,641 B2
(45) Date of Patent: Jun. 5, 2018

(54) FINDING PREDICTIVE CROSS-CATEGORY SEARCH QUERIES FOR BEHAVIORAL TARGETING

(75) Inventor: Adwait Ratnaparkhi, San Jose, CA (US)

(73) Assignee: Excalibur IP, LLC, New York, NY (US)

( * ) Notice: Subject to any disclaimer, the term of this patent is extended or adjusted under 35 U.S.C. 154(b) by 2011 days.

(21) Appl. No.: 12/766,279

(22) Filed: Apr. 23, 2010

(65) Prior Publication Data

US 2011/0264513 A1    Oct. 27, 2011

(51) Int. Cl.
*G06Q 30/02*    (2012.01)
(52) U.S. Cl.
CPC ......... *G06Q 30/02* (2013.01); *G06Q 30/0246* (2013.01)
(58) Field of Classification Search
CPC ..................................................... G06Q 30/02
USPC .............................................................. 705/14
See application file for complete search history.

(56) References Cited

U.S. PATENT DOCUMENTS

| | | | |
|---|---|---|---|
| 6,839,680 | B1 | 1/2005 | Liu et al. |
| 6,934,748 | B1 | 8/2005 | Louviere et al. |
| 6,973,418 | B1 | 12/2005 | Kirshenbaum |
| 2002/0194055 | A1 | 12/2002 | Takakura et al. |
| 2003/0046265 | A1 | 3/2003 | Orton et al. |
| 2003/0154282 | A1 | 8/2003 | Horvitz |
| 2003/0177054 | A1 | 9/2003 | Reinbold et al. |

(Continued)

FOREIGN PATENT DOCUMENTS

| | | |
|---|---|---|
| WO | WO 2003/025696 A3 | 3/2003 |
| WO | WO 2005/006283 A3 | 1/2005 |
| WO | WO 2005/010702 A3 | 2/2005 |
| WO | WO 2005/119521 A2 | 12/2005 |

OTHER PUBLICATIONS

Click-based evidence for decaying weight distributions in search effectiveness metrics by Zhang, Yuye; Park, Laurence A; F; Moffat , Alistair. Information Retrieval 13.1:46-69. Springer Science & Business Media. (Feb. 2010) (Year: 2010).*

(Continued)

*Primary Examiner* — Eric R Netzloff
*Assistant Examiner* — Michael R Stibley
(74) *Attorney, Agent, or Firm* — Mauriel Kapouytian Woods LLP; Lana Akopyan; James Woods

(57) ABSTRACT

A method and apparatus for finding predictive cross-category search queries for behavioral targeting in a networked online display advertising system. The methods include aggregating a training model dataset, the training model dataset comprising a history of clicks corresponding to historical advertisements. The training model dataset also contains plurality of targeting categories related to the history of clicks. Various techniques are disclosed for selecting a plurality of features from the training model dataset and calculating a click probability for a subject advertisement to be clicked by a user from a page, the calculating operations using features of the page that is to be presented to the user. Embodiments include mapping a particular query to one of the targeting categories and then presenting the subject advertisement selected on the basis of the value of the click probability. Normalization scales down the value of the click probabilities to filter out false positive categories.

20 Claims, 8 Drawing Sheets

(56) References Cited

U.S. PATENT DOCUMENTS

| | | |
|---|---|---|
| 2003/0229629 A1 | 12/2003 | Jasinschi et al. |
| 2004/0103017 A1 | 5/2004 | Reed et al. |
| 2004/0107125 A1 | 6/2004 | Guheen et al. |
| 2004/0141003 A1 | 7/2004 | Nivers et al. |
| 2005/0033771 A1 | 2/2005 | Schmitter et al. |
| 2005/0159996 A1 | 7/2005 | Lazarus |
| 2005/0234763 A1 | 10/2005 | Pinto et al. |
| 2006/0155764 A1 | 7/2006 | Tao |
| 2006/0218141 A1 | 9/2006 | Tuttle et al. |
| 2007/0011039 A1 | 1/2007 | Oddo |
| 2007/0100796 A1 | 5/2007 | Wang |
| 2007/0239517 A1 | 10/2007 | Chung et al. |
| 2007/0239518 A1 | 10/2007 | Chung et al. |
| 2007/0239535 A1 | 10/2007 | Koran et al. |
| 2007/0260520 A1* | 11/2007 | Jha .................. G06Q 30/02 705/14.44 |
| 2007/0260596 A1 | 11/2007 | Koran et al. |
| 2007/0260624 A1 | 11/2007 | Chung et al. |
| 2008/0004865 A1* | 1/2008 | Weng .................. G06F 17/277 704/9 |
| 2008/0228576 A1* | 9/2008 | Yonezaki .................. 705/14 |
| 2010/0211533 A1* | 8/2010 | Yang .................. G06N 99/005 706/12 |

OTHER PUBLICATIONS

Adam L. Berger, Vincent J. Della Pietra, and Stephen A. Della Pietra. A maximum entropy approach to natural language processing. Comput. Linguist., 22(1):39{71, 1996.

Ye Chen, Dmitry Pavlov, and John F. Canny. Large-scale behavioral targeting. In KDD '09: Proceedings of the 15th ACM SIGKDD international conference on Knowledge discovery and data mining, pp. 209{218, New York, NY, USA, 2009. ACM.

Kishore Papineni. Why inverse document frequency? In NAACL '01: Second meeting of the North American Chapter of the Association for Computational Linguistics on Language technologies 2001, pp. 1{8, Morristown, NJ, USA, 2001. Association for Computational Linguistics.

Jun Yan, Ning Liu, Gang Wang, Wen Zhang, Yun Jiang, and Zheng Chen. How much can behavioral targeting help online advertising? in WWW '09: Proceedings of the 18th international conference on World wide web, pp. 261{270, New York, NY, USA, 2009. ACM.

U.S. Appl. No. 11/394,343, filed Mar. 29, 2006, Koran, Office Action dated Nov. 25, 2011.

U.S. Appl. No. 11/394,332, filed Mar. 29, 2006, Koran, Office Action dated Nov. 25, 2011.

* cited by examiner

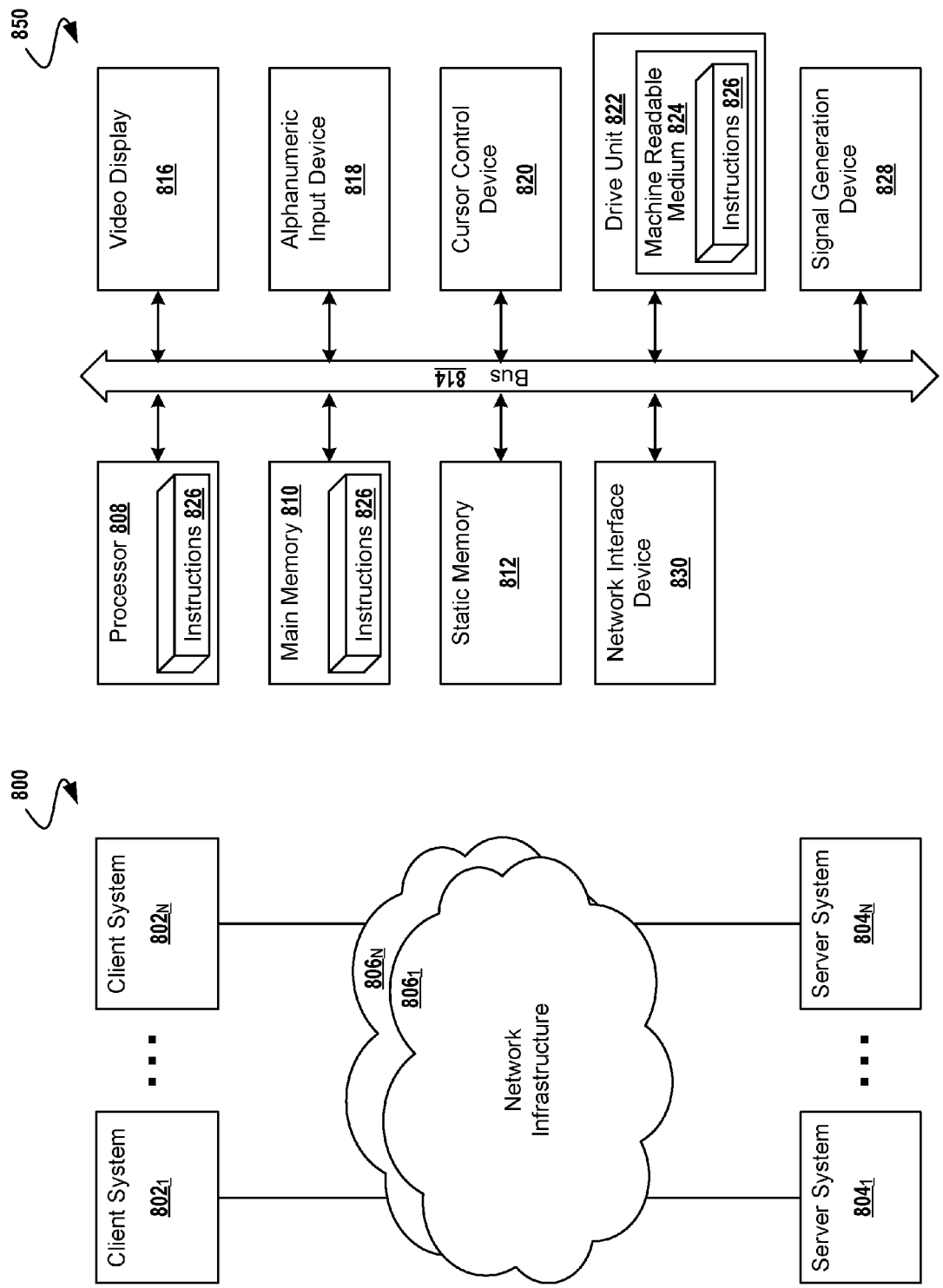

FINDING PREDICTIVE CROSS-CATEGORY SEARCH QUERIES FOR BEHAVIORAL TARGETING

FIELD OF THE INVENTION

The present invention relates generally to advertising, more specifically to finding predictive cross-category search queries for behavioral targeting in a network-based display advertising environment.

BACKGROUND OF THE INVENTION

Among internet advertisers, behavioral targeting (BT) is a common way to target internet advertisements towards a segment of the internet audience. BT algorithms attempt to match users to ads based on the historical activity of the users and the perceived category of the advertisement. For example, a user who had browsed pages (e.g. web pages) related to automobiles yesterday might be a good candidate for being presented an auto-related advertisement today. Although there are many kinds of historical user features that are useful in BT, the state of the art is advanced by focusing on a class of features shown herein to be a good indicator of user interest, namely search queries.

The very nature of the internet facilitates a two-way flow of information between users and advertisers and allows these transactions to be conducted in real time or near-to-real time. For example, a user may request an ad and may intentionally, or inherently, transmit various pieces of data describing himself or herself. Additionally, an advertising management system may be able to intelligently determine which ads to place on a given web page at a given website property requesting advertisement content, thus increasing the revenue for the parties involved and increasing user satisfaction by eliminating "nuisance" ads.

Current systems, including BT systems, fail to fully exploit the interactive aspects of the internet in the advertising realm. In some cases, current advertising systems do not take full advantage of the stores of information available allocating advertisements to advertisement placements. For example, current BT systems fail to provide "cross-category" associations for queries. In current BT implementations, an automatic query categorizer is used to assign categories to queries, yet only "in-category" queries are used as evidence to qualify a user as having interest in such a category.

However, there may be certain queries (and associated advertisements) that are associated with a BT category (i.e. a cross-category), but would not be categorized into that category using current BT systems. For example, a query like "cash for clunkers" may be categorized into the "Finance" category by a content-based query categorizer, but it may be even more strongly associated with clicks in the "Autos" category.

Accordingly, there exists a need for predicting the cross-category search queries, and using the predicted cross-category search queries for optimization of allocation of advertisements to a user in a network-based environment.

SUMMARY OF THE INVENTION

Probabilistic selection techniques including feature selection techniques are disclosed herein in order to find informative lists of queries for one or more behavioral targeting categories of interest, which may include "cross-category" areas of interest. A set of queries are evaluated in a click probability model, which model attempts to predict the probability that a user will click a given advertisement shown on some page (e.g. a web page) based on historical search queries of the user, taken in combination with features of candidate advertisements and features of the page to be displayed. As shown and described herein, methods for feature selection of a large corpus of display advertisement data is used in combination with features of the page to improve click prediction. The methods include aggregating a training model dataset (e.g. a click probability model), the training model dataset comprising a history of clicks corresponding to historical advertisements. The training model dataset also contains plurality of targeting categories related to the history of clicks. Various techniques are disclosed for selecting a plurality of features from the training model dataset and calculating a click probability for a subject advertisement to be clicked by a user from a page, the calculating operations using features of the page that is to be presented to the user. Embodiments include mapping a particular query to one of the targeting categories and then presenting the subject advertisement selected on the basis of the value of the click probability determined using the training model dataset.

BRIEF DESCRIPTION OF THE DRAWINGS

The novel features of the invention are set forth in the appended claims. However, for purpose of explanation, several embodiments of the invention are set forth in the following figures.

FIG. 8 is a diagrammatic representation of a network including nodes for client computer systems, nodes for server computer systems, and nodes for network infrastructure, according to one embodiment.

DETAILED DESCRIPTION

Figure 1:
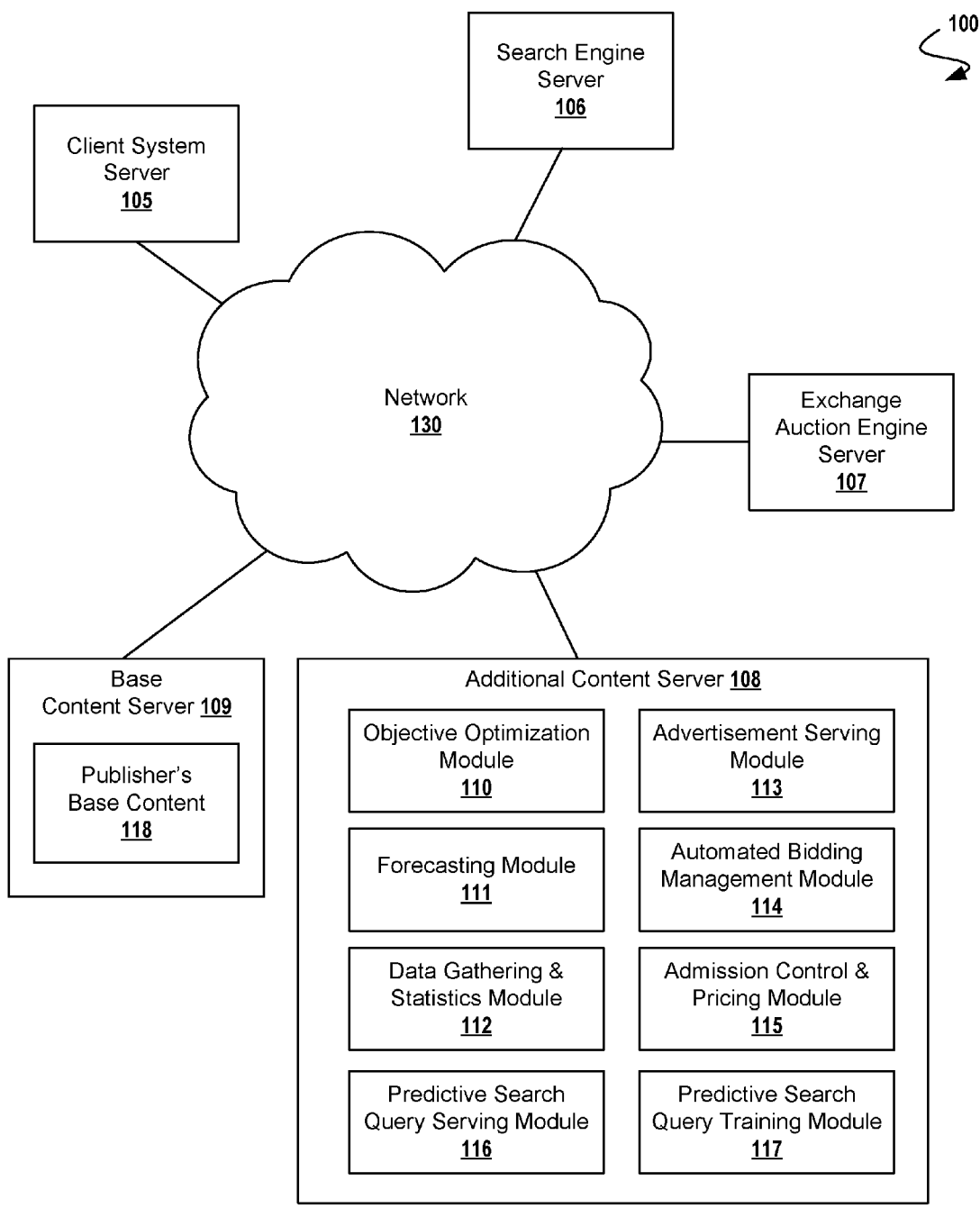
FIG. 1 depicts an advertising server network environment including modules for implementing finding predictive cross-category search queries for behavioral targeting, in which some embodiments operate.

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Scope of Behavioral Targeting Content-Based Query Categorizers

Behavioral targeting refers to the use of historical user internet activity to improve the relevance of internet advertisements that are shown to that user. Search queries are thought to be a good indicator of user interest. Several feature selection techniques are disclosed herein in order to find informative lists of queries for each behavioral targeting category of interest, which may include "cross-category" areas of interest. Indeed, a set of queries are evaluated in a click probability model, which model attempts to predict the probability that a user will click a given advertisement shown on some page (e.g. a web page) based on historical search queries of the user in combination with features of the advertisement, and features of the page. As shown and described herein, feature selection of a large corpus of display advertisement data show that queries obtained by feature selection based on historical search queries of the user features of the advertisement in combination with features of the page can improve click prediction for some behavioral categories. Furthermore, it is observed that for some categories, the topmost ranked queries (e.g. ranked in combination with features of the page) are highly relevant towards their corresponding human-assigned behavioral category, despite being induced from historical data using purely statistical methods.

Various techniques for capturing cross-category user interests disclosed herein are based on (1) historical search queries of the user, (2) features of the advertisement, and (3) features of the page. Such techniques differ in application and results from techniques based on BT categories. For example, in some cases, such BT categories may have been formed into a hierarchical taxonomy, which taxonomy may be artificially constrained. That is, some automatic categorizers within BT systems determine if a query q is relevant to a BT category c by categorizing q (with an automatic technique that examines the content of q), and only considers q to be relevant if q's category is assigned to the same category c.

In contrast, the feature selection techniques disclosed herein associate queries to BT categories not only by their content, but rather, also by a query's association with a click event. Also, the techniques disclosed herein have advantages over a content-based query categorizer in many scenarios, including the following example scenarios:
1. Queries $q_1$ and $q_2$ might both have content related to the category Autos, yet only $q_1$ might be related to actually clicking on advertisements in the Autos category.
2. A query $q_3$ might have content in some unrelated category, e.g. Insurance, yet it might be highly predictive of clicks in the Autos category.

In the above scenarios, an approach relying solely on a content-based categorizer might not distinguish $q_1$ from $q_2$, nor even detect that $q_3$ is relevant to Autos. In contrast, a technique that learns from historical data to infer that $q_1$ and $q_3$ are both likely to be followed by a click on a display advertisement in the Autos category is shown to be useful in both scenarios. In various embodiments of the invention disclosed herein, various techniques are used to find predictive queries for a click in a BT category without regard for the category implied by their content.

Overview of Networked Systems for Online Advertising

FIG. 1 depicts an advertising server network environment including modules for finding predictive cross-category search queries for behavioral targeting. Otherwise stated, the advertising server network environment implements a system for delivery of display advertising, which display advertising is selected using one or more techniques for finding predictive cross-category search queries for behavioral targeting. In the context of internet advertising, placement of advertisements within an internet environment (e.g. environment 100 of FIG. 1) has become common. By way of a simplified description, an internet advertiser may select a particular property (e.g. Yahoo.com/Finance, or Yahoo.com/Search), and may create an advertisement such that whenever any internet user, via a client system server 105 renders the web page from the selected property, possibly using a search engine server 106, the advertisement is composited on the web page by one or more servers (e.g. base content server 109, additional content server 108) for delivery to a client system server 105 over a network 130. Given this generalized delivery model, and using techniques disclosed herein, sophisticated online advertising might be practiced. More particularly, an advertising campaign might include highly-customized advertisements delivered to a user corresponding to highly-specific target predicates, or, even in the absence of highly-specific target predecates, an advertising campaign may use behavioral targeting and/or be subject to techniques for finding predictive search queries. Again referring to FIG. 1, an internet property (e.g. a publisher hosting the publisher's base content 118 on a base content server 109) might be able to measure the number of visitors that have any arbitrary interest, characteristic, demographic, target predicates, or attribute, possibly using an additional content server 108 in conjunction with a data gathering and statistics module 112. Thus, an internet user's demographics and interest might be 'known' in quite some detail as pertains to a wide range of user queries, interest categories, or other demographics or attributes.

In some cases, multiple competing advertisers might elect to bid in a market via an exchange auction engine server 107 in order to win the most prominent spot, or an advertiser might enter into a contract (e.g. with the internet property, or with an advertising agency, or with an advertising network, etc) to purchase the desired spots for some time duration (e.g. all top spots in all impressions of the web page empirestate.com/hotels for all of 2010, by users who are in the top income bracket). Such an arrangement, and variants as used herein, is termed a contract.

In embodiments of the systems within environment 100, components of the additional content server 108 perform processing such that, given an advertisement opportunity (e.g. an impression opportunity), processing determines which, if any, contract(s) match the advertisement opportunity. In particular, embodiments of the invention herein may use behavioral targeting and/or be subject to techniques for finding predictive search queries.

In some embodiments, the environment 100 might host a variety of modules to serve management and control operations (e.g. an objective optimization module 110, a forecasting module 111, a data gathering and statistics module 112, an advertisement serving module 113, an automated bidding management module 114, an admission control and pricing module 115, a predictive search query serving module 116, a predictive search query training module 117, etc) pertinent to serving advertisements to users. In particular, the modules, network links, algorithms, assignment techniques, serving policies, and data structures embodied within the environment 100 might be specialized so as to perform a particular function or group of functions reliably while observing capacity and performance requirements. For example, an additional content server 108, possibly in conjunction with a predictive search query serving module 116 and a predictive search query training module 117, might be employed to implement an approach for finding predictive cross-category search queries for behavioral targeting.

For finding predictive search queries for behavioral targeting, some work in BT has used a linear regression models and/or Poisson models to estimate the click probability of a user shown a display advertisement in a particular BT category. In these works, the historical user features (including search queries) are first aggregated at the user level. Then, features are aggregated further into intensity and recency values. The models in these works use the features of the advertisement (i.e. its BT category) and the historical features of the user (e.g. data from cookies) to quantify or learn the behaviors of the user, specifically the likelihood of a user click event as related to a particular BT category.

Other implementations include the use of correlation of past page views and search queries with respect to sponsored search advertisement clicks on search results pages. Using such techniques might create user segments by clustering users according to their search queries.

However, as earlier described, although various BT techniques may produce higher average click-through rates (CTRs) when compared with the CTRs of a user segment that did not use BT data, there remain several scenarios where the legacy BT techniques might be improved. The embodiments of the present invention for finding predictive cross-category search queries for behavioral targeting differ from earlier attempts in at least the aspect of considering the effect of the page to be displayed as well as the effect of user features and advertisement features in the click probability model. In more formal terms, the click probability model attempts to estimate the probability of a click based on features selected from several sets of data: In an exemplary embodiment, an exemplary probability term may be written as, P(click|page,ad,user).

Method Overview

Figure 2:
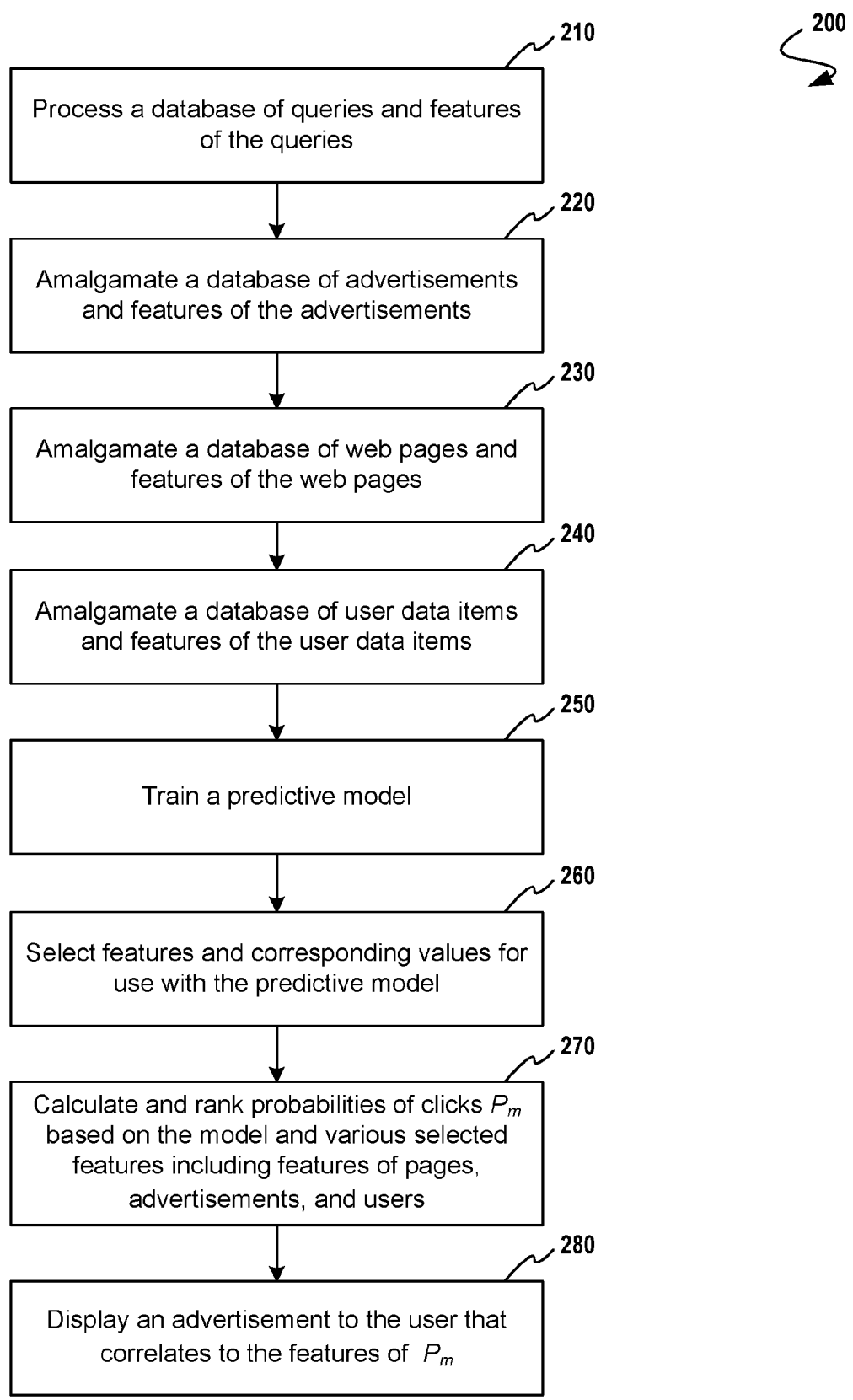
FIG. 2 depicts a flowchart showing possible steps performed for finding predictive cross-category search queries for behavioral targeting, in which some embodiments operate.

FIG. 2 depicts a flowchart showing possible steps performed for finding predictive cross-category search queries for behavioral targeting. As earlier indicated, the click probability model attempts to estimate the probability of a click event based on features selected from several datasets, such as:

a dataset containing a history of queries (and corresponding features including corresponding clicks)
  a dataset containing web pages and/or features thereto
  a dataset containing advertisements and/or features thereto
  a dataset containing information pertaining to a particular user and/or features thereto After processing the above datasets in accordance with embodiments of techniques for finding predictive cross-category search queries for behavioral targeting, the predictive (i.e. probability) term may be written as, P(click|page, ad,user).

In narrative terms, a method for displaying a particular advertisement to a particular user on a particular page after finding predictive cross-category search queries for behavioral targeting can be described by the following:

Data Collection
    process a database of queries and features of the queries (see operation 210)
    amalgamate a database of advertisements and features of the advertisements (see operation 220)
    amalgamate a database of web pages and features of the web pages (see operation 230)
    amalgamate a database of user data items and features of the user data items (see operation 240)
  Predictive Model Training
    train a predictive model (see operation 250)
  Feature Selection
    select features and corresponding values for use with the predictive model (see operation 260)
  Advertisement Serving
    calculate and rank probabilities of clicks $P_m$ based on the model and various selected features including features of pages, advertisements, and users (see operation 270)
    display an advertisement to the user that correlates to the features of $P_m$ (see operation 280)

Data Collection

For estimating the probability of a click based on features selected from the datasets of page(s), advertisement(s), and user(s), a module such as a data gathering and statistics module 112 might be employed to collect data. Such data might then be used by a predictive search query training module 117, and/or used by any sub-modules within the predictive search query serving module 116. More specifically (and as is further described below) such modules might be used to implement feature selection techniques and/or to process the display advertisement serving logs (e.g. a database of advertisements) and/or to process search engine logs (e.g. a database of queries). In exemplary embodiments, feature selection techniques may result in storage of an amalgamated features datasets, which may be used as a training model database. One embodiment of such an amalgamated features datasets, which may be used within a training model, is now described.

Figure 3:
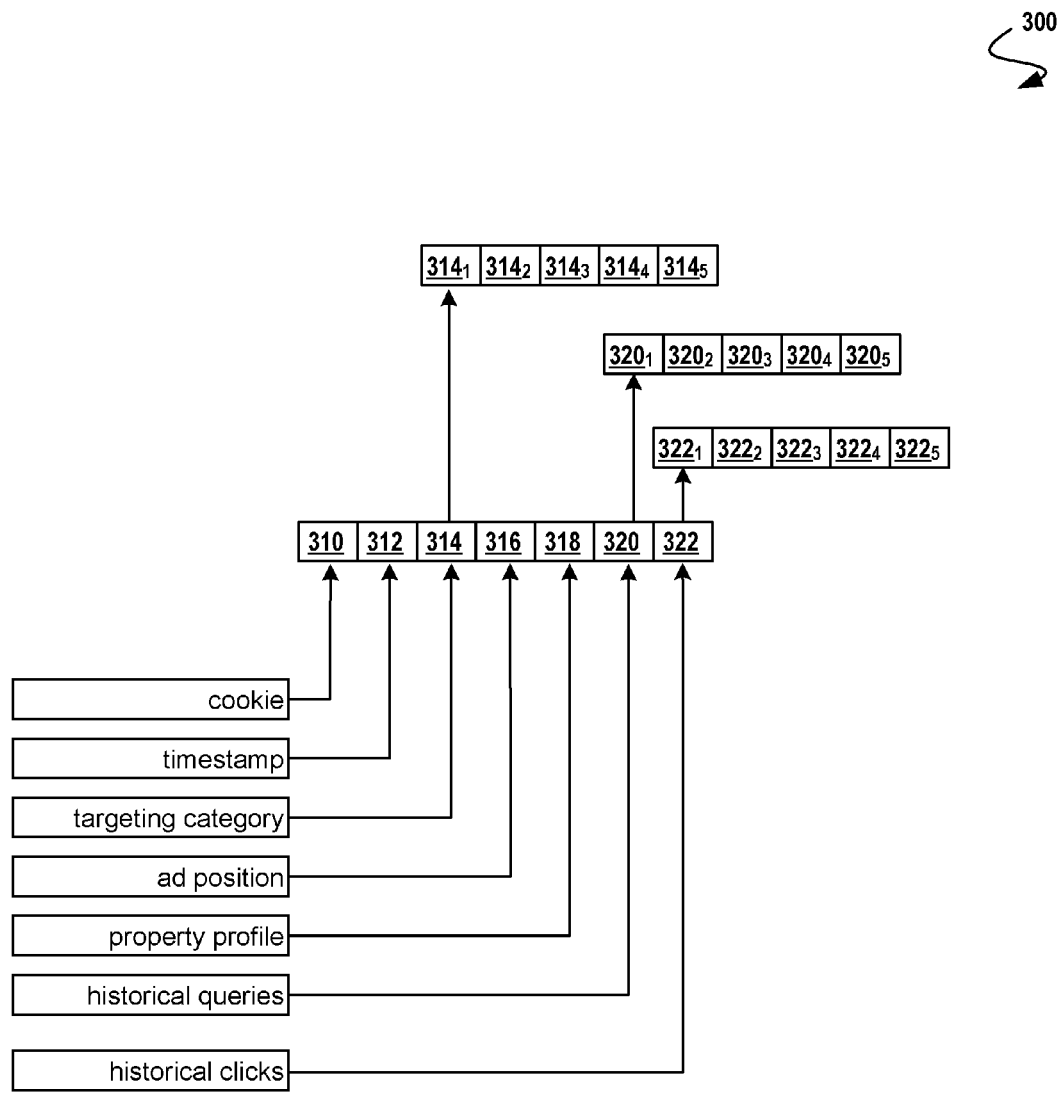
FIG. 3 depicts a data structure for use in forming one or more amalgamated features datasets, in which some embodiments operate.

FIG. 3 depicts a data structure for use in forming one or more amalgamated features datasets. As shown, each feature entry in the amalgamated features datasets system 300 represents an advertisement impression (i.e. the appearance of a particular advertisement on a particular page, and shown to a particular user), and contains one or more of the following fields:

cookie 310: An identifier that characterizes a particular user, possibly using a cookie or other data item.
  timestamp 312: The timestamp of the impression, as found in a display advertisement serving log or other advertisement feature database.
  targeting category 314: A targeting category or a list of targeting categories (e.g. BT categories) covering the advertisement, possibly from a BT category-oriented taxonomy.
  ad position 316: The position of the advertisement within the page as shown to this particular user.
  property profile 318: The property name and/or other information from which this advertisement was shown. Property profiles are more data-rich than URLs. A single property profile might account for many URLs (e.g. sports.yahoo.com, shopping.yahoo.com, news.yahoo.com, news.yahoo.com/headlines, and news.yahoo.com/archive).
  historical queries 320: The historical queries of this user, as a set or list. As shown, the list includes the current day (e.g. the day of the time of the advertisement impression) and five days before. In exemplary embodiments, repeated queries in the history are represented as a single query in the list.
  historical clicks 322: A variable indicating (at least) whether or not this impression resulted in a click on the advertisement (as may be determined by server logs). In some embodiments, data from the server logs may be filtered by the position field such that only advertisements in the top M most prominent advertisement positions are retained. In other embodiments, especially where clicks are sparse, the training set of impressions might need to be very large in order to collect a statistically meaningful number of clicks.

Now, having described a possible set of features present in or extractable from the datasets, a modeling framework is disclosed, which is then followed by a discussion of techniques for feature selection.

Modeling Framework

Embodiments use a conditional maximum entropy framework for click modeling, so that $$p(\text{click}|g, a, u) = \frac{1}{Z(b)} \left[ \prod_{j=1 \ldots k} \alpha_j^{f_j(\text{click},g,a,u)} \right] \quad (1)$$

$$Z(b) = \sum_{\text{click}' \in \{0,1\}} \prod_{j=1 \ldots k} \alpha_j^{f_j(\text{click}',g,a,u)} \quad (2)$$

where $f_j$ is a feature, $\alpha_j > 0$ is the corresponding parameter, g is the page, a is the ad, u is a user, and $Z(b)$ is a normalization factor. Any information about the page, user, or advertisement that is deemed useful for click modeling may be encoded in the feature selection. Several feature selection techniques are presented infra Note that any feature $f_j$ may be defined jointly over the (click, page, ad, user) tuple, written here in a general way:

$$f_j(\text{click}, g, a, u) = \begin{cases} 1 \\ \text{if: click} = 1 \wedge N(g, a, u) \\ 0 \\ \text{otherwise} \end{cases} \quad (3)$$

where $N(g,a,u)$ is a Boolean function returning TRUE if (g,a,u) holds a context of interest.

For example, a context of interest might be determined from analysis of historical queries of the user u, page property names of g, and advertisement categories for the advertisement a. During model training (disclosed in a subsequent section), the parameters $\alpha_j$ are set to maximize the log-likelihood of the training data:

$$L(p) = \sum_{\text{click},g,a,u} \tilde{p}(\text{click}, g, a, u) \log p(\text{click}|g, a, u) \quad (4)$$

where $\tilde{p}(\text{click},g,a,u)$ is the empirical probability of observing (click,g,a,u) in the training set, (i.e. the weight of the training instance).

In the descriptions that follow, all features are defined for click=1, with the exception of the default features defined below, which are defined for both click=1 and click=0.

An exemplary embodiment first introduces a baseline model that is trained with an initial feature set considering only page g and advertisement a features. Other embodiments augment that baseline feature set with historical query features, and then evaluate the impact of adding those features.

Baseline Model

The baseline model has the following kinds of features:
default: Selected default features that are used regardless of the (page,ad,user) tuple when computing p(click=1|...) and p(click=0|...). In this case, the default features are denoted as $f_0$ and $f_1$:

$$f_0(\text{click},g,a,u)=1 \text{ if click}=0,0 \text{ otherwise} \quad (5)$$

$$f_1(\text{click},g,a,u)=1 \text{ if click}=1,0 \text{ otherwise} \quad (6)$$

These features are used to model the prior distribution of clicks (and absence of clicks) in the training set.
targeting category: The targeting category of the advertisement in the impression.
targeting category and ad position: The targeting category of the advertisement in an association with the position of the ad (e.g. conjoined or concatenated).
targeting category and property profile: The targeting category of the advertisement conjoined with the property profile of the page. An example of this feature might be:
$f_j$(click,g,a,u)=1 if click=1, and the property of g is related to "sports" and the category of a is related to "Auto"

else $f_j$(click,g,a,u)=0 \quad (7)

Such a model with this default feature set uses information from only the page g and ad a, Such a model is effectively computing Pr(click|g,a).

Feature Selection Techniques

Techniques presented infra disclose feature selection techniques that integrate user information available in the form of historical queries; these models compute Pr(click|g, a,u) thus extending the default feature selection computations based only on Pr(click|g,a). One goal of these feature selection techniques is to find pairs (q,c) such that query q in the user's history is predictive of clicks on display ads with targeting category c. A pair (q,c) is used to construct a feature $f_{q,c}$ as follows:
$f_{q,c}$(click,g,a,u)=1 if click=1, and c is a valid category of the ad a, and q is the historical query of the user u else $f_{q,c}$(click,g,a,u)=0 \quad (8)

For the following selection techniques, consider those (q,c) pairs that have occurred with clicks. Further, feature sets that are produced from the following methods may be added to the baseline feature set. Any particular feature set may be evaluated with respect to sensitivity to predict clicks on display ads. Strictly as examples of a particular feature set, any one or more of the following feature sets (i.e. frequency threshold, top n frequency, CTR ratio, top n likelihood gain, in-category features, etc) might be considered.

Frequency threshold: Select pairs (q,c) such that $$\text{freq}(q,c,\text{click}) \geq T \quad (9)$$

where T is a threshold value (e.g. 20), q is a query in the user's history, c is a BT category of the advertisement in the impression, and where freq(q,c,click) is the frequency of the pair (q,c) occurring with a click.
Top n frequency: Select the top n (e.g. top 100K) pairs (q,c) when sorted by freq(q, c, click) in descending order.
CTR ratio: Select pairs (q,c) such that the CTR ratio>1. One possible CTR ratio is defined as:

$$CTRratio = \frac{p(\text{click}|c, q)}{p(\text{click}|q)} \quad (10)$$

The CTR ratio is the conditional click probability of the pair (q,c) normalized by the click probability of the query q. In some cases, the normalization has the effect of reducing the score for queries that have high click propensity but are not related to any particular user interest in the BT taxonomy. For example, a pornographic query q may have a high value for p(click|c,q) for some category c. But if it has high click propensity across categories, the denominator p(click|q) will also be high, and therefore the CTR ratio will be low.

Top n likelihood gain: Select the top n (e.g. 100K) pairs (q,c) when sorted by the likelihood gain statistic.

In preparation for using any of the above top n likelihood gain feature selection techniques, any pair (q,c) in the training data may used to construct a candidate feature f. Such a selected candidate feature f may then be evaluated by measuring the gain that it would provide to the likelihood of the training data if it were added to the baseline model. More formally described, begin by denoting p as the baseline model. Then, for candidate feature f, denote $p_f$ as a model which has been trained in a way such that its baseline feature parameters are held to the same values as in p, but where the parameter for $p_f$ is allowed to vary and fit the training data. The likelihood gain of feature $p_f$ is defined as $L(p_f)-L(p)$. A non-zero gain would indicate that the feature f has some information beyond the features in the baseline set.

In exemplary embodiments, the gain computation is given as:

$$\text{gain}(f) = E_p f - E_{\tilde{p}} f - E_{\tilde{p}} f \log \frac{E_p f}{E_{\tilde{p}} f} \quad (11)$$

$$E_p f = \sum_{\text{click},g,a,u} \tilde{p}(g, a, u) p(\text{click}|g, a, u) f(\text{click}, g, a, u) \quad (12)$$

$$E_{\tilde{p}} f = \sum_{\text{click},g,a,u} \tilde{p}(\text{click}, g, a, u) f(\text{click}, g, a, u) \quad (13)$$

The computations above use $\tilde{p}$ to denote the empirical probability distribution in the training data. Then, $E_p f$ is the expectation of feature f with respect to the (baseline) model p, while $E_{\tilde{p}} f$ is the observed expectation of f, and gain(f) is the feature gain.

In-category features: Select pairs (q,c) such that $$\text{freq}(q,c,\text{click}) \geq T \quad (14)$$

where q is a query in the user's history, c is a BT category of the advertisement in the impression, freq(q,c,click) is the frequency of the pair (q,c) occurring with a click, and T is a threshold.

As described here, the category c is a valid category of q, such that both the query and advertisement belong to the same category. In some embodiments, the categories for q are determined by a machine-learned query categorizer trained from a manually annotated list of queries. While other feature selection methods aim to induce the list of pairs from statistical association with clicks, this technique looks at the content of q to determine the category.

Using the techniques in this list, various embodiments augment the feature set of the baseline model. The baseline or augmented feature set may then be used in a training model for finding predictive cross-category search queries for behavioral targeting.

Training a Model

Given a selected feature set, training and test instances for the model may be extracted, the instances in the form:

$$\text{click}=f(x_1 \ldots x_n)$$

where click$\in\{0,1\}$ and $x_1 \ldots x_n$ are the historical contexts of the (page, ad, user) tuple.

Given a selected feature set together with the training and test instances, an iterative scaling algorithm (or other techniques) may be used to estimate the model parameters from this data. This iterative scaling algorithm attempts to find a parameter setting that maximizes the likelihood (see eq. (1)) based on the training data.

Figure 4:
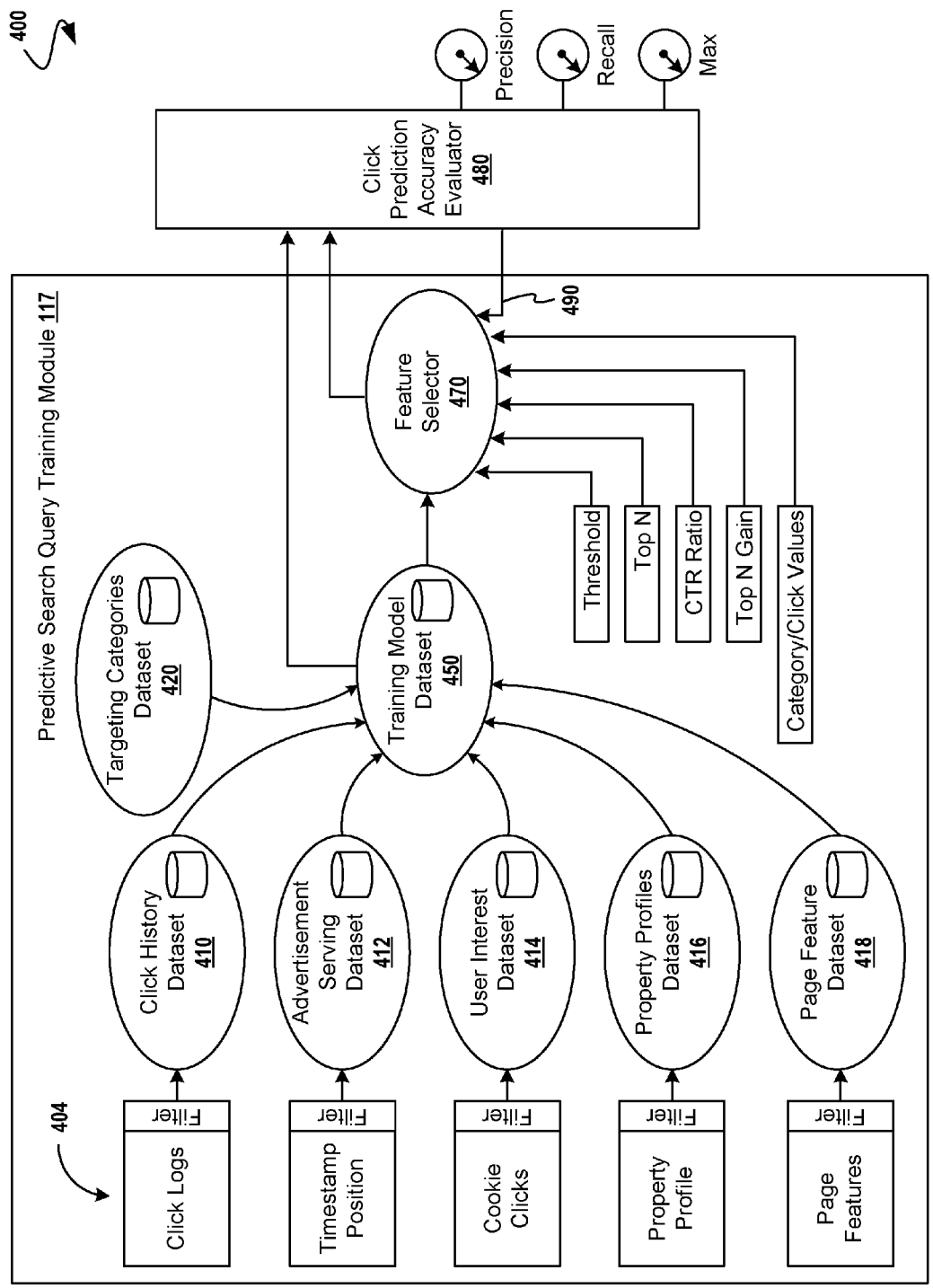
FIG. 4 depicts a data flow diagram for finding predictive cross-category search queries for behavioral targeting, in which some embodiments operate.

FIG. 4 depicts a data flow diagram 400 for finding predictive cross-category search queries for behavioral targeting. Of course, the data flow diagram 400 is an exemplary embodiment, and some or all (or none) of the operation characteristics mentioned in the discussion of the data flow diagram 400 might be carried out or present in any environment. As shown, the data flow diagram 400 shows a computer data flow for aggregating a training model dataset 450. The training model dataset 450 might comprise any one or more aspects of input datasets, stored as a click history dataset 410, a historical advertisement serving dataset 412, a user interest dataset 414, a property profiles dataset 416, a page feature dataset 418, and a targeting categories dataset 420 (e.g. a dataset containing a plurality of targeting categories).

Such datasets might be used for aggregating a training model dataset 450; moreover, the data inputs (e.g. click logs, timestamp and position data, cookie data, user clicks, property profiles, web pages and web page features, etc) might be filtered or formatted before being used within a dataset (see data inputs and filters 404).

In exemplary embodiments, a feature selector 470 might be used for selecting, using a computer, a plurality of features from the training model dataset 450. That is, the training model dataset might comprise a vast array of data, all of which might not be used in any particular operation. In fact, as is described in detail herein, a feature selector 470 might evaluate the data and/or combinations of data within the training model dataset and might then select features on the basis of one or more techniques (e.g. a thresholding technique, a top n technique, a CTR ratio technique, a top n gain technique, and/or other techniques).

Having a training model dataset 450 upon which a feature selector 470 might operate supports operations for calculating a click probability for an advertisement to be clicked by a user from a page, the calculating using at least features of the page and the at least one training model dataset. Of course, other click probability calculations might be performed, possibly using different features, and any of a wide range of possibilities might be evaluated using an accuracy evaluator. A click prediction accuracy evaluator 480 might rely on comparison to manually generated and/or known-good performance measures. Or, a click prediction accuracy evaluator 480 might rely on statistical methods for calculating performance and/or statistical significance, possibly using measurements of precision, recall, and/or score maximums, as is discussed below.

Evaluation of a Training Model Using Max $F_1$ Score

The click prediction accuracy of a model is often measured by a click prediction accuracy evaluator 480 using metrics for precision and recall, which metrics may be defined as:

correct(t)=# instances for which click=1 and
$\quad p(\text{click}=1|g,a,u)>t$ (15)

proposed(t)=# instances for which $p(\text{click}=1|g,a,u)>t$ (16)

precision(t)=correct(t)/proposed(t) (17)

recall(t)=correct(t)/# instances for which click=1 (18)

where t is a threshold in between 0 and 1. A precision vs. recall graph can be obtained by varying the threshold t. The precision and recall at a threshold t can be summarized into a single statistic, known as the $F_1$ score:

$$F_1(t) = 2 \times \frac{\text{precision}(t) \times \text{recall}(t)}{\text{precision}(t) + \text{recall}(t)} \quad (19)$$

and the max $F_1$ score is defined as the highest $F_1$ for any threshold:

$$\max F_1 = \max_t F_1(t) \quad (20)$$

Here the max $F_1$ score is used to summarize an entire precision vs. recall curve.

Statistical Significance

Further, it is possible to compare a pair of different click probability models using a paired t-test that determines if the raw score differences between a pair of click probability models over exactly the same test instances are statistically significant. Given two click probability models $p_1$ and $p_2$, and a (page, ad, user) tuple (g,a,u) in the test data, the value:

$$p_1(\text{click}=1|g,a,u) - p_2(\text{click}=1|g,a,u) \quad (21)$$

may be computed for each test instance, thus assembling a vector of differences for the selected pair of models. If μ is the sample mean of this vector of differences, the null hypothesis is $H_0=\{\mu=0\}$, which means that, on average, the two models return the same scores for the test instances. If $H_0$ is true for a $(p_1, p_2)$ pair, it means that the models are not behaving differently on the test data.

As shown in FIG. 4, a click prediction accuracy evaluator 480 may be employed in a manual setting, or it may be instrumented in a manner so as to provide feedback to the predictive search query training module 117, including to the feature selector 470. In such embodiments, the feature selector may be tuned adaptively or optimized adaptively based at least in part the outputs of the click prediction accuracy evaluator 480. Some of such embodiments may provide feedback to the feature selector 470 via feedback path 490.

Figure 5:
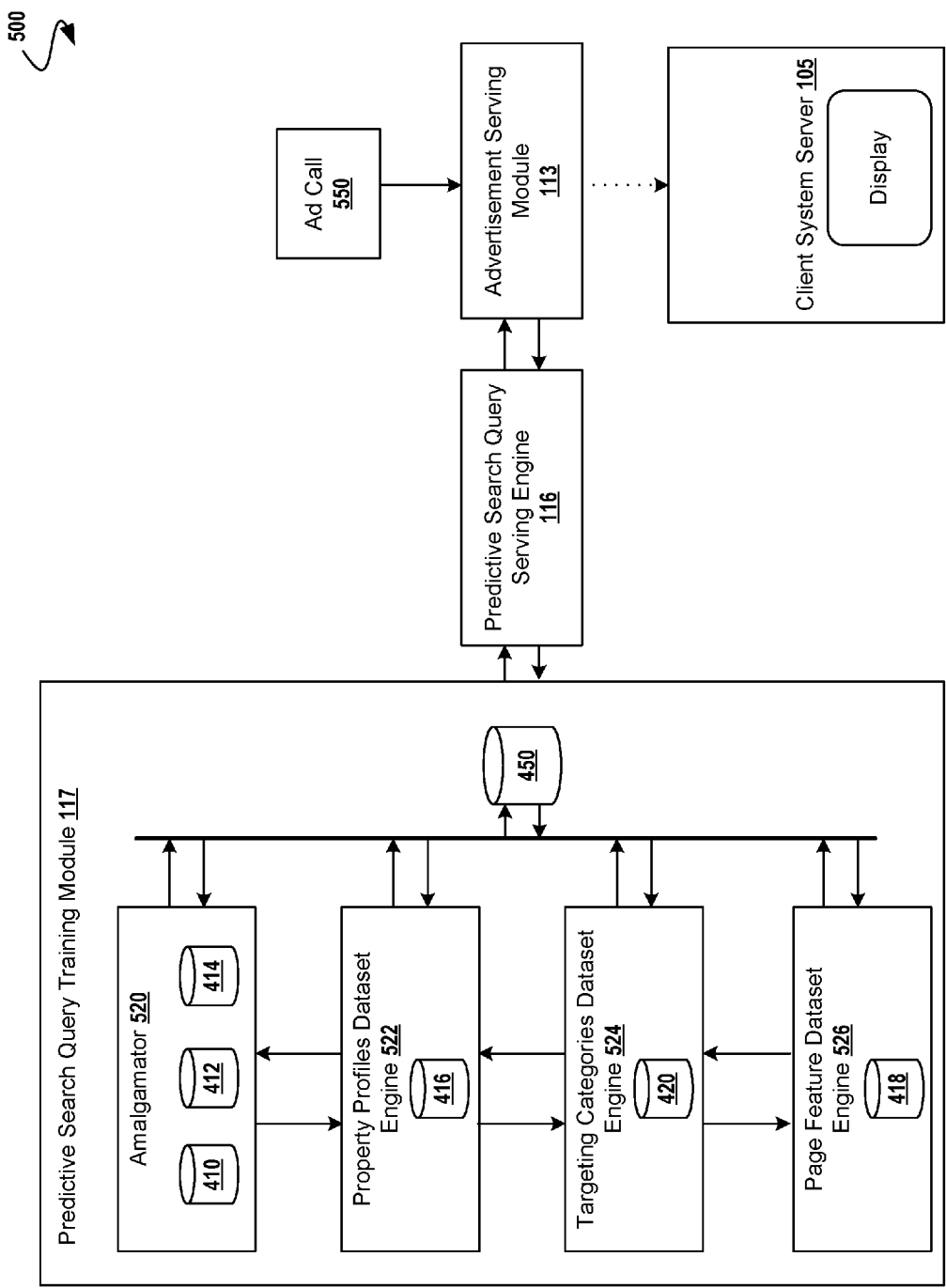
FIG. 5 depicts a system for finding predictive cross-category search queries for behavioral targeting, in which some embodiments operate.

System for Finding Predictive Cross-Category Search Queries for Behavioral Targeting FIG. 5 depicts a system 500 for finding predictive cross-category search queries for behavioral targeting. Of course, the system 500 is an exemplary embodiment, and some or all (or none) of the functional blocks or operations or characteristics mentioned in the discussion of the system 500 might be present or carried out in any environment. As shown, the system 500 shows computer-implemented modules for finding predictive cross-category search queries for behavioral targeting. The amalgamator 520 serves for aggregating at least portions used in producing a training model dataset. The amalgamator 520 might assemble one or more datasets, for example, a click history dataset 410, a historical advertisement serving dataset 412, and/or a user interest dataset 414. Similarly, a property profiles dataset engine 522 might assemble a property profiles dataset 416, a targeting categories dataset engine 524 might assemble a targeting categories dataset 420, and a page feature dataset engine 526 and might assemble a page feature dataset 418. Such modules (e.g. amalgamator 520, a property profiles dataset engine 522, a targeting categories dataset engine 524, and a page feature dataset engine 526) might operate cooperatively to produce a training model dataset 450. Such a training model dataset 450 might be constructed to contain records similar to feature entry as previously shown and described in the discussion of the amalgamated features datasets system 300. In some embodiments, an amalgamated features datasets system 300 may contain a history of clicks corresponding to historical advertisements in a plurality of targeting categories.

As previously discussed, a feature selector 470 (possibly in cooperation with a predictive search query training module 117 and/or a predictive search query serving module 116) might serve for selecting a plurality of features from the training model dataset. With such a training model dataset then, a system 500 has at least the datasets and values used for calculating a click probability for a subject advertisement to be clicked by a user from a page. Of course, in some embodiments, the system 500 serves for mapping a particular query to at least one targeting category. Thus, the system 500 implements a method for finding predictive cross-category search queries for behavioral targeting. In exemplary embodiments, upon occurrence of an ad call 550, an advertisement serving module 113 might cooperate with a predictive search query serving module 116 to predict one or more cross-categories, and an advertisement serving module 113 might further operate to compose the requested page (e.g. possibly with selected cross-category advertisements). In somewhat more detail, once a cross-category has been predicted, more specifically, once one or more cross-category advertisements have been selected and ranked on the basis of click probability, the system 500 (possibly using an advertisement serving module 113), operates to present to the user (possibly using a client system server 105) one or more advertisements (e.g. one or more of those selected on the basis of the value of the click probability) on the page requested by the user, which page corresponds to the ad call 550.

Of course, many variations of the training model dataset 450 are reasonable and contemplated, including variations wherein the training model dataset includes aggregating at a plurality of page features—plus a plurality of advertisement features, a plurality of user interest features, and/or a plurality of internet property features. Furthermore, some implementations of an amalgamator 520 might include aggregating a user cookie, a timestamp, a targeting category, a position, a property, or other information relevant to the disclosed prediction techniques (e.g. Eq. 1). Exemplary embodiments of a targeting categories dataset engine 524 might implement a target category mapping that includes a normalization operation (see Eq. 10). Also, embodiments of a feature selector 470 might be implemented within the context of system 500, and such an implementation might include selection based on a threshold feature, a top n feature, a CTR ratio feature, a top n gain feature, an in-category feature, or any other feature, for that matter.

Figure 6:
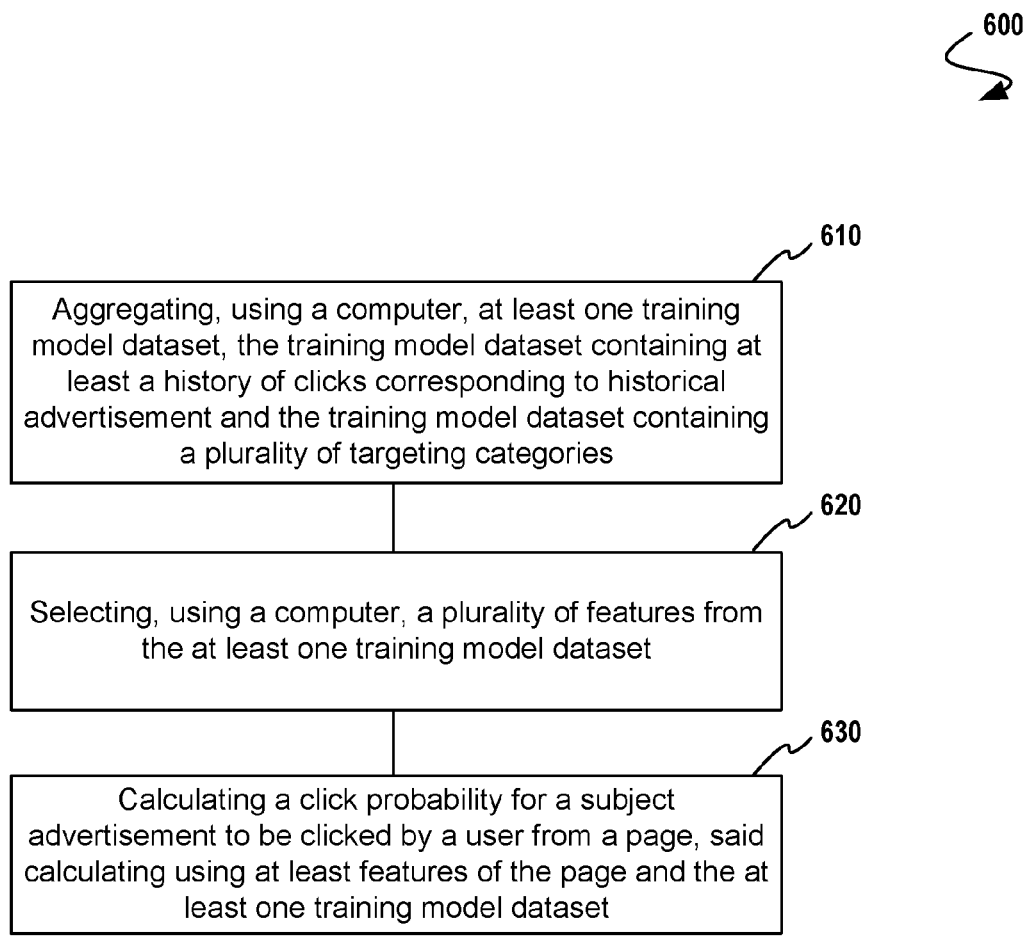
FIG. 6 depicts a block diagram of a method for behavioral targeting, in which some embodiments operate.

FIG. 6 depicts a block diagram of a method for behavioral targeting. As an option, the present method 600 may be implemented in the context of the architecture and functionality of the embodiments described herein. Of course, however, the method 600 or any operation therein may be carried out in any desired environment. The operations of the method can, individually or in combination, perform method steps within method 600. Any method steps performed within method 600 may be performed in any order unless as may be specified in the claims. As shown, method 600 implements a method for behavioral targeting, the method 600 comprising operations for: aggregating, using a computer, at least one training model dataset, the training model dataset containing at least a history of clicks corresponding to historical advertisement and the dataset containing a plurality of targeting categories (see module 610); selecting, using a computer, a plurality of features from the at least one training model dataset (see module 620); and calculating a click probability for a subject advertisement to be clicked by a user from a page, the calculating using at least features of the page and the at least one training model dataset (see module 630).

Figure 7:
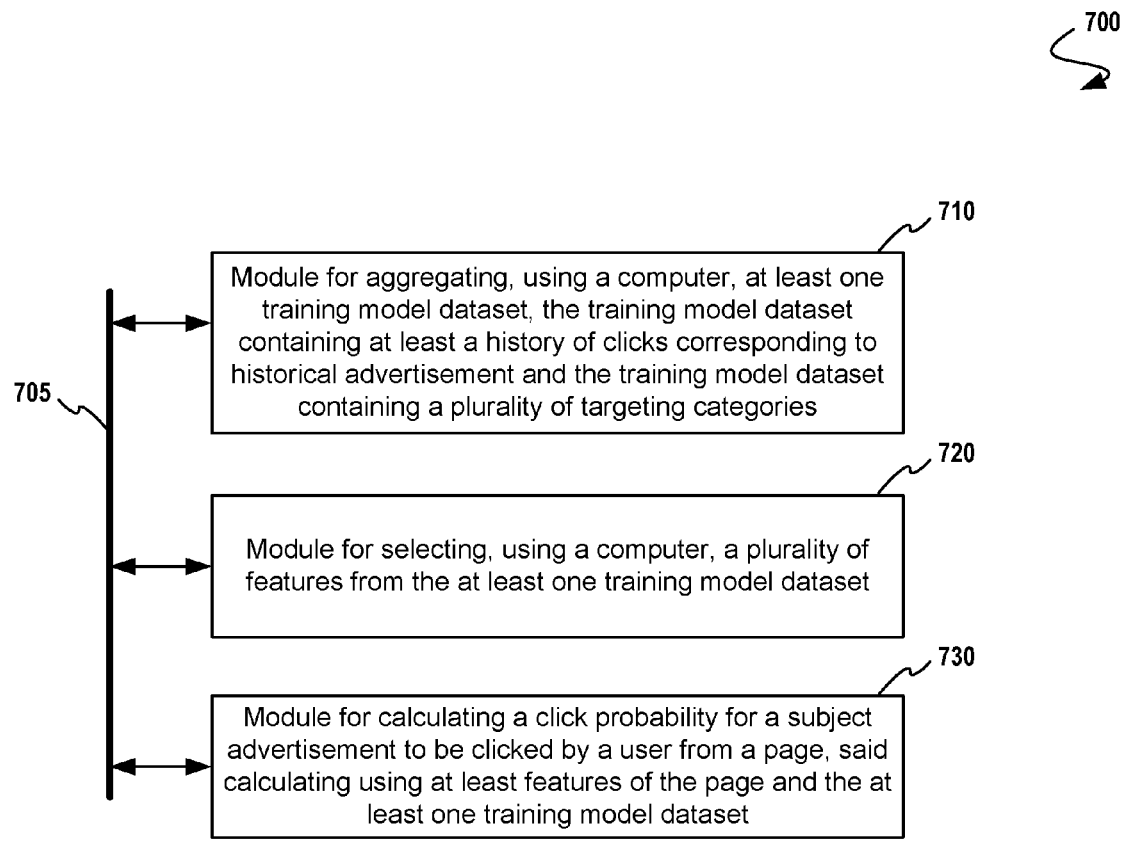
FIG. 7 depicts a block diagram of a system to perform certain functions of an advertising server network finding predictive cross-category search queries, in which some embodiments operate.

FIG. 7 depicts a block diagram of a system to perform certain functions of an advertising server network finding predictive cross-category search queries. As an option, the present system 700 may be implemented in the context of the architecture and functionality of the embodiments described herein. Of course, however, the system 700 or any operation therein may be carried out in any desired environment. As shown, system 700 comprises a plurality of modules including a processor and a memory, each module connected to a communication link 705, and any module can communicate with other modules over communication link 705. The modules of the system can, individually or in combination, perform method steps within system 700. Any method steps performed within system 700 may be performed in any order unless as may be specified in the claims. As shown, FIG. 7 implements an advertising server network finding predictive cross-category search queries as a system 700, comprising modules including a module for aggregating, using a computer, at least one training model dataset, the training model dataset containing at least a history of clicks corresponding to historical advertisement and the dataset containing a plurality of targeting categories (see module 710); a module for selecting, using a computer, a plurality of features from the at least one training model dataset (see module 720); and a module for calculating a click probability for a subject advertisement to be clicked by a user from a page, the calculating using at least features of the page and the at least one training model dataset (see module 730).

FIG. 8 is a diagrammatic representation of a network 800, including nodes for client computer systems $802_1$ through $802_N$, nodes for server computer systems $804_1$ through $804_N$, nodes for network infrastructure $806_1$ through $806_N$, any of which nodes may comprise a machine 850 within which a set of instructions for causing the machine to perform any one of the techniques discussed above may be executed. The embodiment shown is purely exemplary, and might be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 850 includes a processor 808 (e.g. a processor core, a microprocessor, a computing device, etc), a main memory 810 and a static memory 812, which communicate with each other via a bus 814. The machine 850 may further include a computer display unit 816 that may comprise a touch-screen, or a liquid crystal display (LCD), or a light emitting diode (LED) display, or a cathode ray tube (CRT). As shown, the computer system 850 also includes a human input/output (I/O) device 818 (e.g. a keyboard, an alphanumeric keypad, etc), a pointing device 820 (e.g. a mouse, a touch screen, etc), a drive unit 822 (e.g. a disk drive unit, a CD/DVD drive, a tangible computer readable removable media drive, an SSD storage device, etc), a signal generation device 828 (e.g. a speaker, an audio output, etc), and a network interface device 830 (e.g. an Ethernet interface, a wired network interface, a wireless network interface, a propagated signal interface, etc).

The drive unit 822 includes a machine-readable medium 824 on which is stored a set of instructions (i.e. software, firmware, middleware, etc) 826 embodying any one, or all, of the methodologies described above. The set of instructions 826 is also shown to reside, completely or at least partially, within the main memory 810 and/or within the processor 808. The set of instructions 826 may further be transmitted or received via the network interface device 830 over the network bus 814.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method for finding predictive cross-category search queries for behavioral targeting, comprising:
aggregating, using a computer, at least one training model dataset formed by a particular configuration of a data structure, the training model dataset comprising multiple configured data structures each representing an advertisement impression and including at least a history of clicks corresponding to historical advertisement information, a plurality of page features including a position of an advertisement within the page as shown to a particular user, and a plurality of internet property features, and the training model dataset comprising a plurality of targeting categories derived from the historical advertisement information;

training a baseline training model dataset with an initial feature set including page information features and advertisement information features, wherein the initial feature set is used to model a prior distribution of clicks and absence of clicks in a training set;

determining historical query and targeting category pairs such that the user historical query of the pair is predictive of clicks on display ads with the targeting category of the pair;

selecting, using a computer, a plurality of features from the at least one training model dataset, wherein the selected plurality of features include initial features and at least one candidate feature, wherein the candidate feature varies to fit training data and provides measuring likelihood gain of the candidate feature when added to the baseline training model dataset;

calculating a click probability for a subject advertisement to be clicked by a user from a page, said calculating using at least the selected plurality of features, wherein the initial features include features of the page, and wherein the at least one candidate feature is different from the initial features of the at least one training model dataset, and said calculating being normalized for queries that have a high click propensity and no relation to any user interest in a behavioral targeting taxonomy; and serving the subject advertisement to the user, when the click probability of the subject advertisement is predictive of clicks on display ads based on the determined historical query and targeting category pairs.

2. The method of claim 1, further comprising:
mapping a particular query to at least one targeting category; and
presenting, on a computer display, the subject advertisement on the page, the subject advertisement selected on the basis of the value of the click probability.

3. The method of claim 2, wherein the mapping is performed using only an association between a query and at least one of a history of clicks.

4. The method of claim 1, wherein aggregating the training model dataset includes aggregating at least one of, a plurality of advertisement features, a plurality of user interest features, a plurality of internet property features, a plurality of page features.

5. The method of claim 1, wherein aggregating the training model dataset includes aggregating a data structure including at least one of, a user cookie, a timestamp, a targeting category, a position, a property.

6. The method of claim 1, wherein the mapping includes a normalization operation.

7. The method of claim 1, wherein the selecting includes at least one of, a threshold feature, a top n feature, a CTR ratio feature, a top n gain feature, an in-category feature.

8. The method of claim 1, wherein the selecting is performed using a click prediction accuracy evaluator.

9. An advertising server network for finding predictive cross-category search queries for behavioral targeting, comprising:
a module for aggregating, using a computer, at least one training model dataset formed by a particular configuration of a data structure, the training model dataset comprising multiple configured data structures each representing an advertisement impression and including at least a history of clicks corresponding to historical advertisement information, a plurality of page features including a position of an advertisement within the page as shown to a particular user, and a plurality of internet property features, and the training model dataset comprising a plurality of targeting categories derived from the historical advertisement information;

a module for training a baseline training model dataset with an initial feature set including page information features and advertisement information features, wherein the initial feature set is used to model a prior distribution of clicks and absence of clicks in a training set;

a module for determining historical query and targeting category pairs such that the user historical query of the pair is predictive of clicks on display ads with the targeting category of the pair;

a module for selecting, using a computer, a plurality of features from the at least one training model dataset, wherein the selected plurality of features include initial features and at least one candidate feature, wherein the candidate feature varies to fit training data and provides measuring likelihood gain of the candidate feature when added to the baseline training model dataset;

a module for calculating a click probability for a subject advertisement to be clicked by a user from a page, said calculating using at least the selected plurality of features, wherein the initial features include features of the page, and wherein the at least one candidate feature is different from the initial features of the at least one training model dataset, and said calculating being normalized for queries that have a high click propensity and no relation to any user interest in a behavioral targeting taxonomy; and serving the subject advertisement to the user, when the click probability of the subject advertisement is predictive of clicks on display ads based on the determined historical query and targeting category pairs.

10. The advertising server network of claim 9, further comprising:
mapping a particular query to at least one targeting category; and
presenting, on a computer display, the subject advertisement on the page, the subject advertisement selected on the basis of the value of the click probability.

11. The advertising server network of claim 10, wherein the mapping is performed using only an association between a query and at least one of a history of clicks.

12. The advertising server network of claim 9, wherein aggregating the training model dataset includes aggregating at least one of, a plurality of advertisement features, a plurality of user interest features, a plurality of internet property features, a plurality of page features.

13. The advertising server network of claim 9, wherein aggregating the training model dataset includes aggregating a data structure including at least one of, a user cookie, a timestamp, a targeting category, a position, a property.

14. The advertising server network of claim 9, wherein the mapping includes a normalization operation.

15. The advertising server network of claim 9, wherein the selecting includes at least one of, a threshold feature, a top n feature, a CTR ratio feature, a top n gain feature, an in-category feature.

16. A non-transitory computer readable medium comprising a set of instructions which, when executed by a computer, cause the computer to find predictive cross-category search queries for behavioral targeting, the set of instructions for:
- aggregating, using a computer, at least one training model dataset formed by a particular configuration of a data structure, the training model dataset comprising multiple configured data structures each representing an advertisement impression and including at least a history of clicks corresponding to historical advertisement information, a plurality of page features including a position of an advertisement within the page as shown to a particular user, and a plurality of internet property features, and the training model dataset comprising a plurality of targeting categories derived from the historical advertisement information;
- training a baseline training model dataset with an initial feature set including page information features and advertisement information features, wherein the initial feature set is used to model a prior distribution of clicks and absence of clicks in a training set;
- determining historical query and targeting category pairs such that the user historical query of the pair is predictive of clicks on display ads with the targeting category of the pair;
- selecting, using a computer, a plurality of features from the at least one training model dataset, wherein the selected plurality of features include initial features and at least one candidate feature, wherein the candidate feature varies to fit training data and provides measuring likelihood gain of the candidate feature when added to the baseline training model dataset;
- calculating a click probability for a subject advertisement to be clicked by a user from a page, said calculating using at least the selected plurality of features, wherein the initial features include features of the page, and wherein the at least one candidate feature is different from the initial features of the at least one training model dataset, and said calculating being normalized for queries that have a high click propensity and no relation to any user interest in a behavioral targeting taxonomy; and
- serving the subject advertisement to the user, when the click probability of the subject advertisement is predictive of clicks on display ads based on the determined historical query and targeting category pairs.

17. The computer readable medium of claim 16, further comprising:
- mapping a particular query to at least one targeting category; and
- presenting, on a computer display, the subject advertisement on the page, the subject advertisement selected on the basis of the value of the click probability.

18. The computer readable medium of claim 17, wherein the mapping is performed using only an association between a query and at least one of a history of clicks.

19. The computer readable medium of claim 16, wherein aggregating the training model dataset includes aggregating at least one of, a plurality of advertisement features, a plurality of user interest features, a plurality of internet property features, a plurality of page features.

20. The computer readable medium of claim 16, wherein aggregating the training model dataset includes aggregating a data structure including at least one of, a user cookie, a timestamp, a targeting category, a position, a property.

* * * * *